April 15, 1930.   E. E. CLEMENT   1,754,882
POLYPHASE BROADCAST DISTRIBUTION
Original Filed Nov. 27, 1926   2 Sheets-Sheet 1
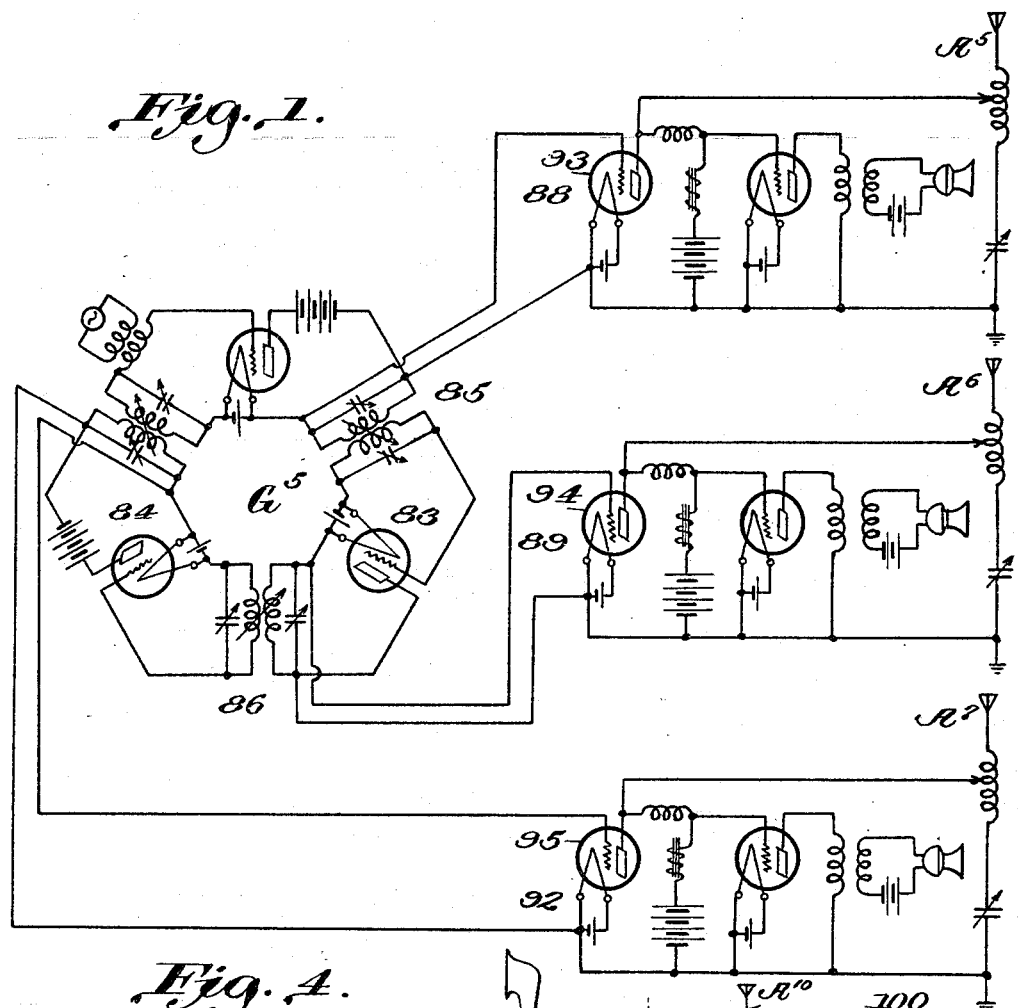
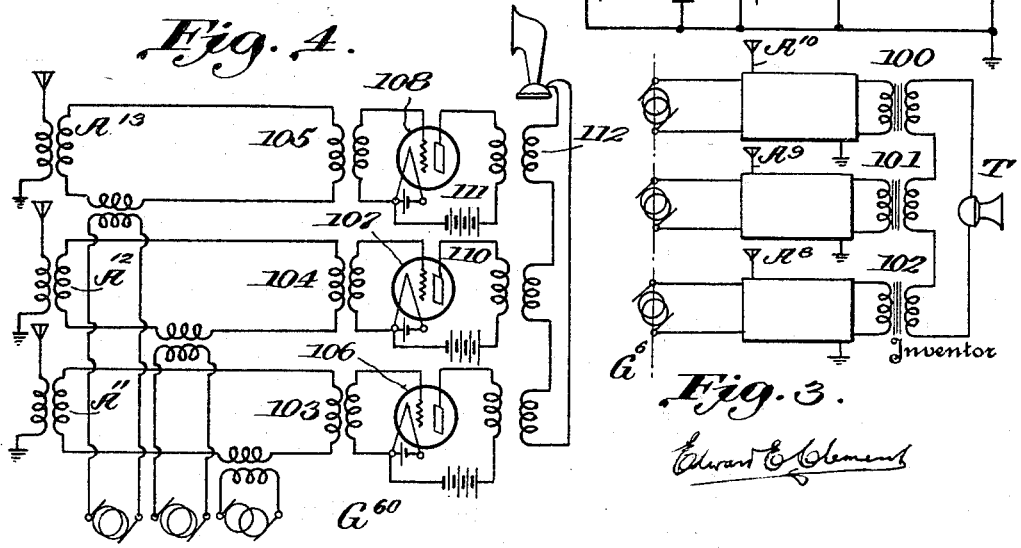

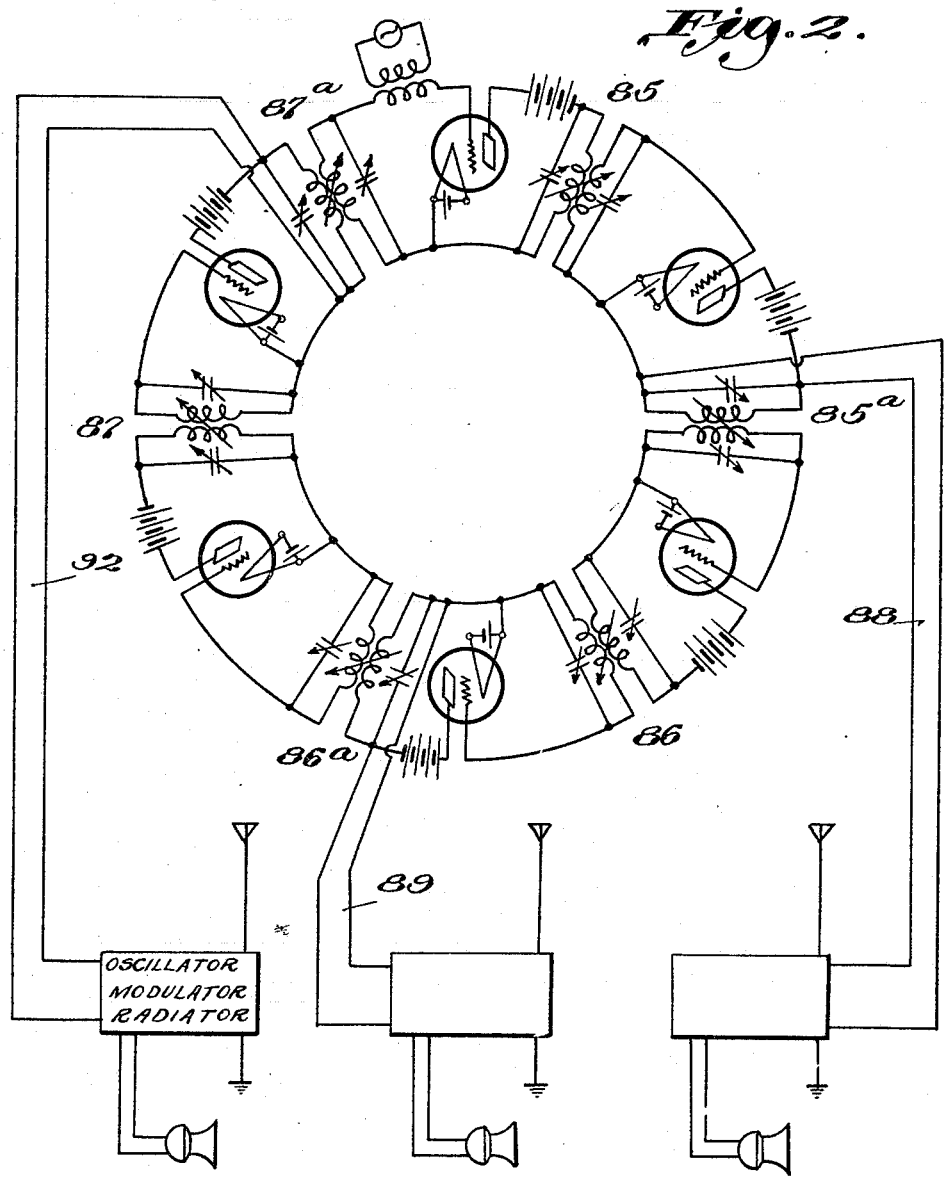

Patented Apr. 15, 1930

1,754,882

UNITED STATES PATENT OFFICE

EDWARD E. CLEMENT, OF WASHINGTON, DISTRICT OF COLUMBIA, ASSIGNOR TO EDWARD F. COLLADAY, OF WASHINGTON, DISTRICT OF COLUMBIA

POLYPHASE BROADCAST DISTRIBUTION

Original application filed November 27, 1926, Serial No. 151,117, Patent No. 1,652,092. Divided and this application filed November 18, 1927. Serial No. 234,140.

My invention relates to the transmission of intelligence, by means of polyphase currents, in such manner as to permit what I have called "silent wave transmission", and to increase the number of available channels. The present application is a division of my prior copending application Serial No. 151,117, filed November 27, 1926, patented December 6, 1927, as No. 1,652,092. The invention to be claimed herein is that shown particularly in Figs. 9 and 10 of said patent.

Where the several phases in a polyphase transmission system are symmetrical in relation to each other, as in a two-phase or a three-phase system, with phases 180° or 120° apart, it can be shown that the algebraic sum of the energy values in the two or the three phases, respectively, at any given instant, is equal to zero. I take advantage of this by transmitting the same or different programs on the several phases of transmitted current of the same frequency, whereby ordinary instruments, receiving all the phases in one input circuit, will either remain silent so far as any modulations are concerned, or will reproduce a very faint and unintelligible sound. By means of an analyzer, using a homodyne principle, I have discovered that separate phases may be separately received on symmetrical circuits similar to those in the transmitter, whereby the relation of the phases is fixed and determined with respect to each other, and whereby the modulations which they bear may be individually taken off and detected, either as components of one harmonious whole, or as different programs.

Broadly stated, an important part of the present invention relates to the transmission, reception, and selection of programs, by means of fixed and determinate phase differences in carrier currents of the same frequency. In its simplest form, this system involves the generation, for example, of three phases of the same frequency, 120° apart, a separate modulation of each phase, and their transmission over three wires of a three-phase transmission system, in the same manner that three-phase power currents are transmitted. Since the sum of the unmodulated energy waves in the three phases at any given instant is equal to zero, for any three-phase receiving, the unmodulated carrier current will cancel out, leaving only three or a multiple of three so-called modulated side bands on each wire, each side band or band of frequencies being composed of the carrier frequency plus or minus the frequencies modulated upon it, and each carrier frequency component of each side band being 120° dephased from the other two. Any one seeking to receive signals of this kind would have to either bridge two of the three conductors, or make a star or delta connection with all three. In either case, the result would amount to nothing or a very faint jumble. On the other hand, by homodyne receiving, with a three-phase receiver in which the receiving oscillator feeds three different phases of the same frequency in synchronism with the three phases of the transmitter, the three carrier currents with their modulations may be recomposed in their respective circuits and taken off either separately or together, according to the nature of their modulations.

Polyphase transmission by radiation is also contemplated, radiating three phases of the same frequency separately modulated, whereby the unmodulated carrier current wave will cancel out, and three side bands will be transmitted. A homodyne receiver is employed in this case, having its oscillator exactly synchronized with that of the transmitting station, which will enable the three side bands or three separate phases to be separately received, by analysis, and either composed or separately detected to give up their modulations, according to whether they are similarly or dissimilarly modulated.

The invention claimed herein is essentially a transmitter, for use in the system thus outlined, although not limited to such use. It may be employed as a generator of polyphase frequencies and as such may be useful for a variety of purposes. When used as a carrier current or radio transmitter however it is particularly adapted to the purposes hereinbefore set forth because of its symmetry and the possibility of securing exact adjustment of the phases. It is to be understood that a two phase generator might be set up on the same plan, although not disclosed herein.

My invention is illustrated in the accompanying drawings, in which—

Fig. 1 is a diagram with modified form of three-phase transmitter, whereby the several modulating circuits of the different phases are kept entirely separate and distinct from each other.

Fig. 2 illustrates a modification of the circuit of Fig. 1, in which the difference in phase angle is reduced by increasing the number of phases generated, and selecting symmetrical intermediate phases only for transmission.

Fig. 3 is a diagram showing a three-phase transmision system employing separate antennas, with common modulation of the three phases.

Fig. 4 is a diagram of a receiving system which may be used with either of the transmitters illustrated.

Referring to Fig. 1, the principle of my present invention is embodied in a simple form. In this case the generator $G^5$ is shown as consisting of three tubes 82, 83, 84, connected in tandem and symmetrically to form an endless chain. The plate circuit of tube 82 is connected through coupling 85 to the grid circuit of the tube 83, the plate circuit of the latter is connected through coupling 86 to the grid circuit of tube 84 and the plate circuit of the latter is connected through coupling 87 to the grid circuit of the first tube 82. Thus any oscillation set up in any one of the tubes will be repeated round and round as long as the circuits are closed. Input and output circuits of each tube are tuned so as to maintain a constant frequency, and the couplers 85, 86, 87 are variable for purposes of varying the phase displacement as between the tubes. Several arrangements are possible in order to get phases 120° apart. For example, by having the couplings so wound as to completely reverse the phase, at 180° angle, then adjusting the degree of coupling so as to shift the phase angle back through 60°, the desired displacement of 120° may be obtained. Various other expedients will occur to those skilled in the art. In order to maintain the standard frequency, and prevent "creeping" of phase, I provide a standard oscillator $O^3$ at some point in the ring. The output circuits of the respective tubes are tapped by feed circuits 88, 89 and 92 which supply the phase oscillators 93, 94, 95 respectively. Current from each of these oscillators is modulated as before described in connection with Fig. 1, and the modulated waves are then radiated from circuits $A^5$, $A^6$, $A^7$, or transmitted over three phase wire circuit as hereinbefore described.

Fig. 2 shows a modification of this arrangement in which more than three tubes are employed in the generator, the actual number being six, although nine or any multiple of three may be used if desired. In this case the arrangement and operation are precisely the same as in Fig. 1, with the exception that the feed circuits 88, 89, 92 are taken off from the plate circuits of alternate tubes. The advantage gained is that direct and simple adjustment of the couplers 85, $85^a$, 86, $86^a$, 87, $87^a$ is all that is necessary to give the phase displacement. Since there are six tubes, a difference of only 60° is required between the first and second, the second and third, and so on. The three phase current is taken off however as before at points 120° apart. If nine tubes should be employed, the regular displacement between adjacent tubes would be only 40°, and with twelve tubes, only 30°. In this connection it may be well to state that the invention is not limited to three phases, but may use more or less than three if desired.

Figs. 3 and 4 illustrate another modification of the invention which contemplates the unitary common modulation of all three phases of the transmitted current. Fig. 3 shows the transmitter for such a system in which a common microphone T is coupled to the three separate modulator and phase oscillator circuits 100, 101, 102. The three phase current is supplied from the generators $G^6$, and the modulated waves are radiated from antennas $A^8$, $A^9$, $A^{10}$. In this case the unmodulated carrier current is cancelled out as before, side bands are transmitted which may be analyzed, carrier resupplied thereto, and detected as indicated in Fig. 4. The generators $G^{60}$ are of the same frequency and can be adjusted to the same angles as the generators $G^6$. Each of the three generators supplies one of the composition circuits 103, 104, 105 which are coupled to the detectors 106, 107, 108. These three tubes are typical of complete receiving sets, their outputs 109, 110, 111 being shown as coupled in common to a single receiver circuit 112, which may be of any desired character. Instead of radiating the modulated waves in this case they may be transmitted and received by wire as described in my Patent No. 1,652,092.

It is to be understood that in order to make a complete and operative system any of the receivers disclosed in my said patent may be employed, or any other suitable form of receiver, the best and most desirable however according to my present knowledge being the homodyne receivers I have described.

I do not specifically claim the circuits of Figs. 3 and 4 herein, nor any of the subject matter otherwise disclosed but not claimed in my said Patent 1,652,092, the same being included in another application filed as a division hereof.

What I claim is:

1. A polyphase generator comprising a plurality of thermionic tubes connected in tandem for mutual oscillation, with means to produce phase displacement between said tubes.

2. A polyphase generator comprising a plurality of thermionic tubes connected in an endless tandem, with variable couplings and tuning devices interposed between them, and means for taking off current from the output circuits of the several tubes.

3. A polyphase generator comprising thermionic tubes arranged in a group corresponding to the number of phases desired, or any multiple thereof, each tube having its input circuit connected to the output circuit of the preceding tube, and means to adjust the phase angle of excitation by each tube of the following tube, together with means to take off current from the output circuits of such tubes as are in the desired phase relation.

4. A polyphase generator comprising a set of thermionic tubes arranged in a ring tandem, each tube exciting the next succeeding tube through phase adjustment means, and an oscillator associated with said tubes adapted to furnish standard frequency and standard phase excitation thereto.

5. A polyphase generator comprising a plurality of oscillating elements operatively connected seriatim in a circuit forming a closed figure for mutual reactive effect, and means to initially start said elements to oscillate.

In testimony whereof I hereunto affix my signature.

EDWARD E. CLEMENT.